Sept. 11, 1934.  E. P. KINNE  1,972,940
COUPLER
Filed March 2, 1931  3 Sheets-Sheet 2
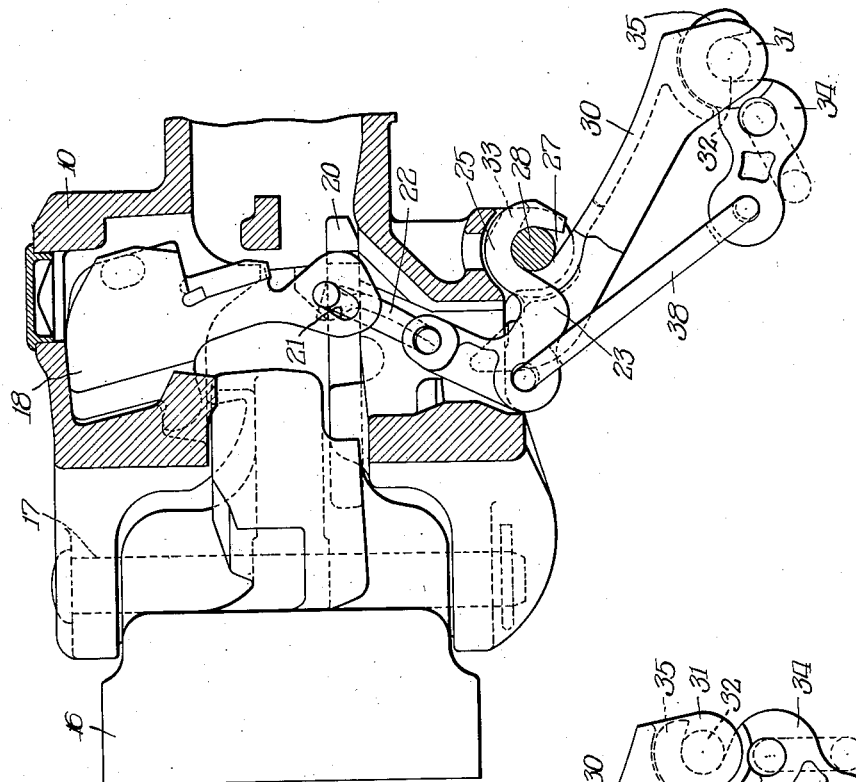
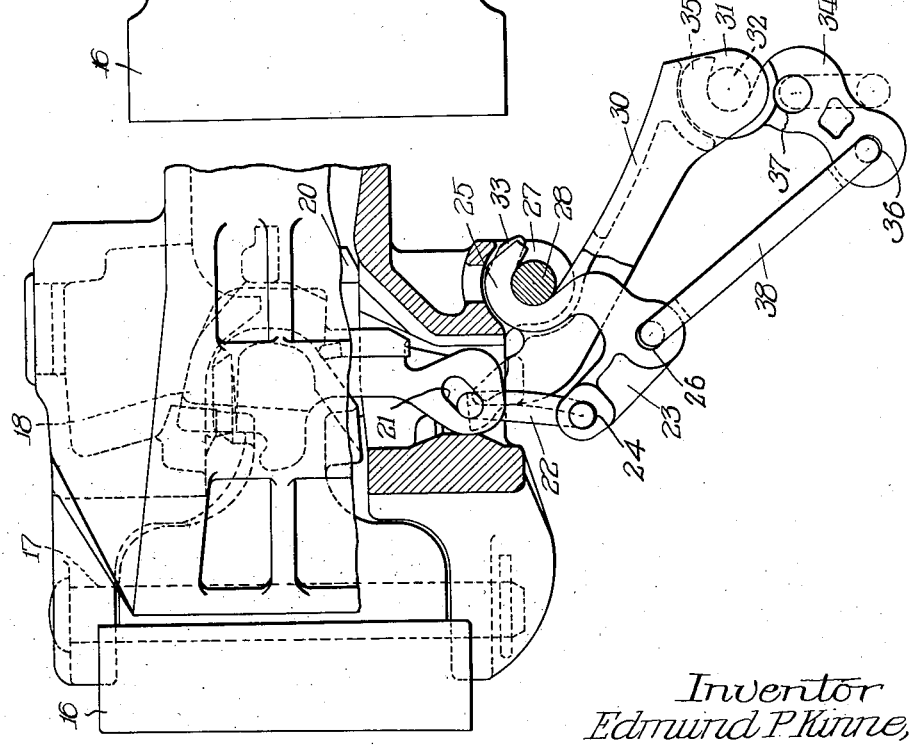
Inventor
Edmund P. Kinne,
By Wilkinson, Huxley, Byron & Knight Attys

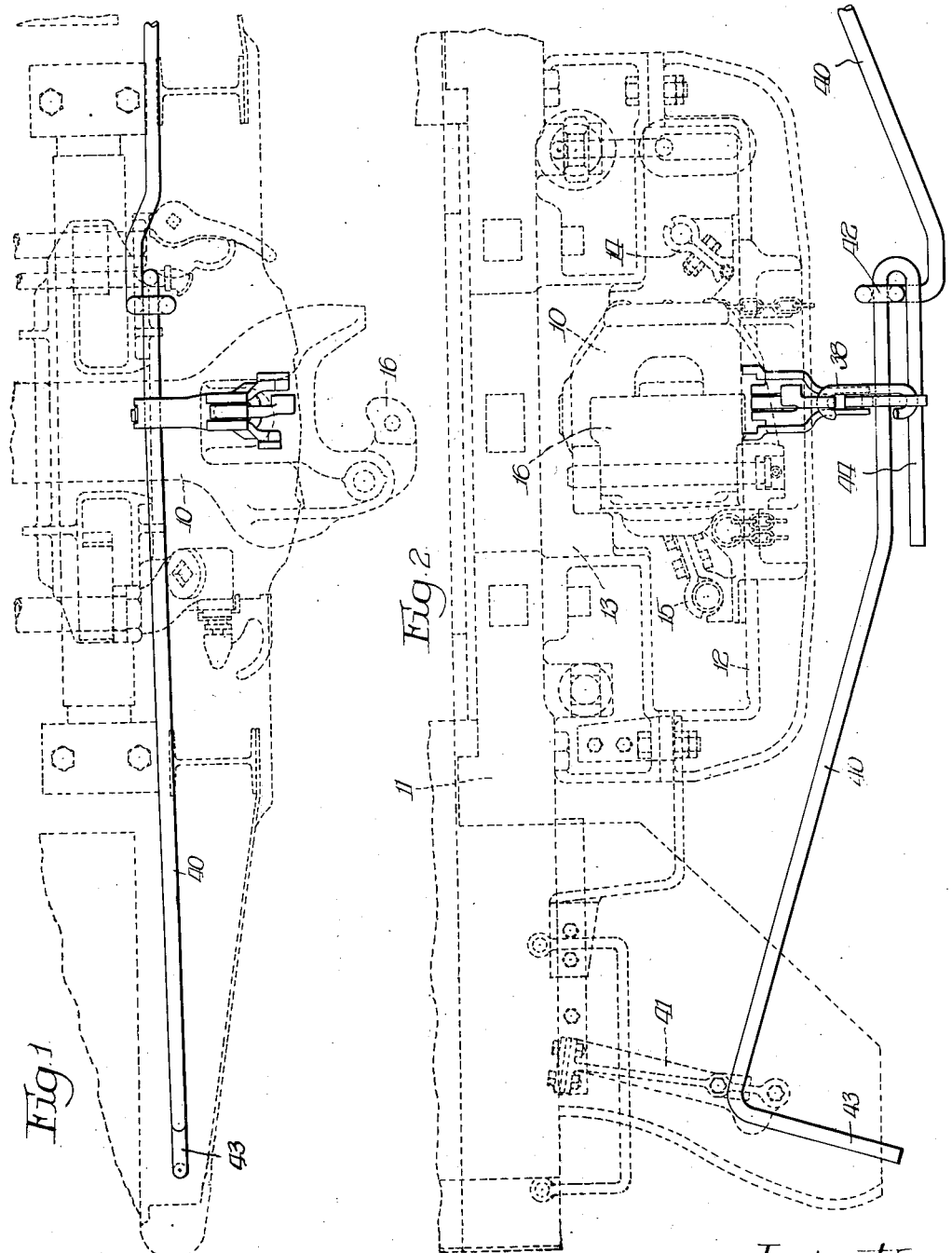

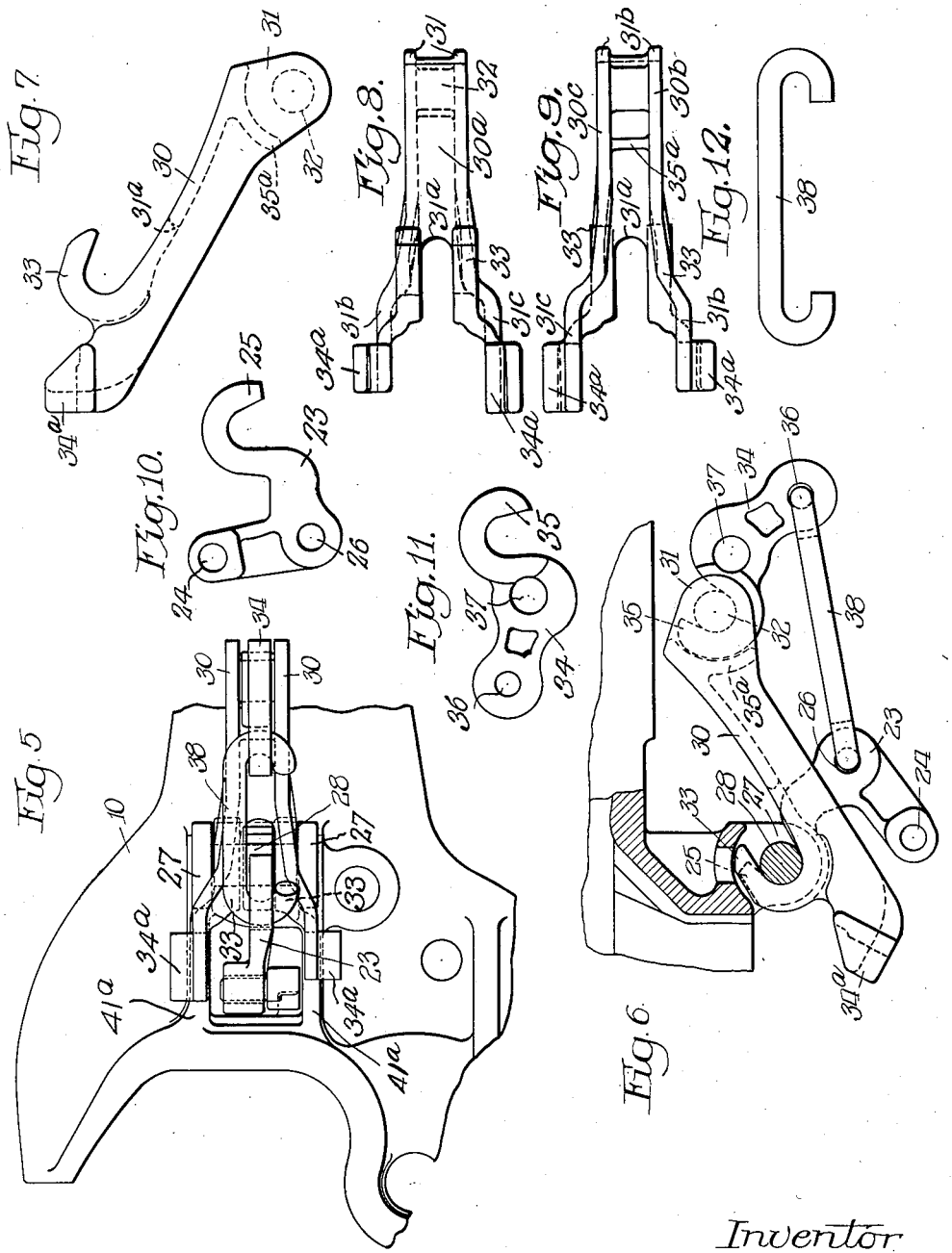

Patented Sept. 11, 1934

1,972,940

UNITED STATES PATENT OFFICE 1,972,940

COUPLER

Edmund P. Kinne, Alliance, Ohio, assignor to American Steel Foundries, Chicago, Ill., a corporation of New Jersey Application March 2, 1931, Serial No. 519,298

15 Claims. (Cl. 213—167)

The invention relates to uncoupling mechanism for operating the lock of a car coupler and has particular reference to mechanism adapted for association with passenger car couplers.

Rotary operated uncoupling mechanism has been found to be quite successful in the operation of those types of car couplers associated with freight cars primarily by reason of the fact that the rotary operating principle results in obtaining maximum leverage. On passenger cars it has been found impossible to connect the uncoupling rods directly to the couplers so as to utilize the above described principle on account of the interference between these rods and the various attachments to the passenger car, such as hose connections and safety chains and also on account of the large lateral movement of the coupler. Inasmuch as the uncoupling rods of a passenger car must necessarily be located much lower down and further to the rear than when associated with freight couplers, the present invention has for an object the provision of novel means whereby operation of passenger car couplers from such location of the rods is secured. To this end another object of the invention is to provide operating means which will avoid all interference from the car end attachments and which will in operation obtain all the advantages peculiar to the rotary operating principle used on freight couplers.

Yet another object is to provide novel operating means for uncoupling passenger couplers which will be simple in construction and which will operate efficiently making provision for the large side motion of the coupler peculiar to passenger service.

Still another object is to provide uncoupling mechanism which will permit of operation from both sides of the car.

A further object is to provide uncoupling mechanism for actuating passenger couplers which will provide maximum leverage without sacrificing ease of operation.

A still further object is to provide uncoupling mechanism which will be efficient and reliable in operation, employing few parts and which may be readily assembled and disassembled and so locked in assembled position that accidental disassociation in service is prevented.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Figure 1 is a plan view showing the relation of the present invention to a car coupler and the portion of a passenger car with which the same is associated;

Figure 2 is a front elevational view of the parts shown in Figure 1;

Figure 3 is a view partly in elevation and partly in section, showing the lock of the coupler operatively connected with the uncoupling mechanism of the present invention;

Figure 4 is a view partly in elevation and partly in section, showing the uncoupling mechanism with lock of the coupler in full knuckle throw position;

Figure 5 is a bottom plan view of the coupler and associated mechanism shown in Figure 3;

Figure 6 is an elevational view, parts in section, showing the method of assembling the parts of the present device;

Figure 7 is a detail view in side elevation of the support arm;

Figure 8 is a top plan view of the support arm shown in Figure 7 of the drawings;

Figure 9 is a bottom plan view of the support arm;

Figure 10 is a detail view of the rotary actuating lever;

Figure 11 is a detail view of the rotor lever; and

Figure 12 is a detail view showing the link used for connecting the actuating and rotor levers.

Referring to Figures 1 and 2 of the drawings, the car coupler 10, selected for illustration with the present uncoupling mechanism, is shown as associated with the end 11 of a passenger car, the end construction of the car providing the necessary carrier iron 12 for supporting the car coupler from the center sills of the car, and the striking casting 13. The coupler 10 has lateral movement upon the carrier iron 12 within the limits of the striking casting, as is common and well known in passenger car service and is furthermore associated with a conventional form of draft gear, not shown, for connecting the coupler with the underframe of the car. Associated with the car end structure are brackets 14 and 15 for supporting the usual steam, air and signal pipes, the brackets having suitable connection or being formed integral with the carrier iron 12, whereby the same are supported from the draft or center sills of the car, the parts and their appurtenances being shown in dotted lines, since these features have no direct relation to the present invention. It will be observed, nevertheless, that these connections are in nowise hampered by the uncoupling mechanism of the present invention and it will be also observed that, while the invention is illustrated in conjunction with a well known form of carrier iron and associated structure, it is not to be taken as limited to the particular features chosen for the purposes of illustration.

The coupler 10 is provided with the knuckle 16 pivoted to the coupler head by the pivot rod 17, and with the lock 18 adapted to operate within the usual opening provided in the coupler and to engage the knuckle thrower 20, upon being located in lock position, as shown in Figure 3. Suitably secured to the depending shank of the lock 18, through means of the elongated slot 21, is a link 22, the same having connection at its other end to a rotary actuating lever 23. The lever, more clearly shown in Figure 10, is in the form of a bell crank having an opening 24 at one end for receiving the link 22 and being provided with a hook shaped end 25 at its other end and an intermediate opening 26. The coupler head is suitably provided with depending spaced lugs 27 connected by the pivot pin 28, which, as shown in Figures 3 and 4, forms a connection for rotatably connecting the lever 23 to the coupler by means of the hooked end 25, the same having engagement with the pin 28.

Also connected to the coupler is a support arm 30, shown in Figures 7, 8 and 9, which is provided at its lower end with spaced flanges 31 connected by the pivot pin 32. This support arm 30 is at its central portion substantially of channel construction, and comprises the web 30a extending between flanges 30b and 30c. The web 30a terminates as at 31a to provide a bifurcated end comprising arms 31b and 31c. These arms 31b and 31c are each formed with spaced hook-shaped ends 33 and with spaced supporting lugs 34a adapted to engage with shoulders on the coupler, as more clearly pointed out hereinafter. By reason of the hook ends 33 the support arm has connection with the coupler, since the ends are adapted to have bearing engagement with the pivot pin 28 and the lugs 34a supporting contact with the coupler. A rotor lever 34, shown in Figure 11, is similarly provided with a hook shaped end 35, opening 36 and an intermediate opening 37. The construction of the rotor lever is such that the hook end 35 is adapted to be inserted between the flanges 31 and to thus have engagement with pivot pin 32 so that the lever is rotatably supported from the support arm, while opening 36 accommodates a connecting link 38, the link passing through opening 26 in actuating lever 23 and thus serving to operatively connect the levers. It will therefore be seen that the actuating lever 23 serves to transmit movements of the rod 40, lever 34 and link 38 to the link 22 and thereby to the lock and also serves to guide the links 38 and 22 during their movement.

In assembling the various parts, as shown in Figure 6, it will be observed that the support arm 30 is located in position with ends 33 in engagement with pivot pin 28 by elevating its rearward end and locating the ends within the lugs 27 and in a similar manner lever 23 can be located in operative position in engagement with the pivot pin and disposed between the spaced hook ends 33 of the support arm. It will be noted that the support arm and lever 23 are connected to and disconnected from the pivot pin 28 only by a movement of the same at an angle to the same so that these members are interlocked in their normal operative positions between the pivot pin and the coupler adjacent thereto. The rotor lever is likewise moved into operative position with pin 32 and the hook end 35 is interlocked between this pin and a shoulder or web 35a disposed between flanges 30b and 30c. With rotor lever 34 pivotally connected to the support arm and operatively associated with lever 23 by link 38, the assembly can be positioned in relation to the lock 18 so that insertion of link 22 will connect the operating lever 23 and the lock whereupon the parts are adapted to be suitably connected to the uncoupling rods 40. With the parts in position, as shown in Figures 3 and 4, it will be noted that the support lugs 34a of the support arm engage shoulders 41a on the bottom face of the coupler, as shown in Figure 5, to maintain the support arm in its correct position. The uncoupling rods 40 are suitably supported by brackets 41 from the car end structure and are operatively connected as at 42 so that actuation of either left handle 43 or the right handle, not shown, will serve to rotate the U-shaped end 44 of the rod.

The uncoupling rod has direct connection to the rotor lever 34 as one leg of the U-shaped end is adapted to pass through opening 37 provided in the lever for the purpose. Upon actuation of the handle 43 rotation will be suitably imparted to the rotor lever and through connecting link 38 to actuating lever 23 to cause actuation of the lock 18 from lock position to release or full knuckle throw position, as shown in Figure 4. The lock is maintained in its released position by the construction of the coupler, as is common and well known in such devices and at the desired time can be suitably actuated through rotation of the knuckle 16 to drop into position where the knuckle 16 is held locked.

It will be observed that the above construction allows actuation of the lock by means of rotation of the uncoupling rods and to thus result in securing maximum leverage through the above mentioned rotary principle. Furthermore the uncoupling rods are suitably connected to the coupler lock although they are located in position below and to the rear of the coupler head so as not to interfere with the hose connections and other end attachments on the end structure of the car. Easy assembly of the various operating parts is possible and it is clear that when the same are once assembled, the attachment of lever 34 to the uncoupling rod prevents accidental disassociation of the parts, however, permitting disassembly of the same, should it be desired. The rotor lever 34 has sliding engagement upon the U-shaped end of the uncoupling rod so as to permit lateral movement of the coupler 10 which in passenger cars is extensive but which is efficiently provided for by the present construction, since the same will accommodate wide lateral movement.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In an uncoupling mechanism, the combination with a car coupler and the lock thereof, of means for operating said lock, including a lever connected to the coupler and said lock, a support arm detachably connected to said coupler, means on said coupler providing a common point of support for said lever and arm, and actuating means for said lever rotatably mounted on said arm.

2. In an uncoupling mechanism, the combination with a car coupler and the lock thereof, of means for operating said lock, including a lever pivotally supported from the coupler and connected to the lock, a support arm detachably connected at one end to the coupler, means on said coupler providing a common point of support for said lever and arm, an actuating lever, said last mentioned lever having rotatable connection to said arm, and means connecting said levers.

3. In an uncoupling mechanism, the combination with a car coupler and the lock thereof, of means for operating said lock, including a lever pivotally supported from the coupler and connected to the lock, a support arm detachably connected at one end to the coupler, means on said coupler providing a common point of support for said lever and arm, a rotatable lever, means mounting said rotatable lever on said arm in spaced relation to said first mentioned lever, and means connecting said levers to each other and to an uncoupling rod.

4. In an uncoupling mechanism, the combination with a car coupler and the lock thereof, of means for moving said lock to unlocked position, said means including a support arm detachably connected to the car coupler, a rotatable lever detachably connected to said coupler, means on said coupler providing a common point of support for said lever and arm, means connecting the lever to said lock, and operating means for said lever supported from the lower end of said arm.

5. In coupler mechanism, the combination of a car coupler and lock therefor, an unlocking mechanism, means for supporting said mechanism on said coupler, said mechanism including a supporting member engaging with said means, and interconnected levers for operation of said lock, one of said levers being supported on said means and the other of said levers being supported on said supporting member.

6. In coupler mechanism, the combination of a car coupler and lock therefor, an unlocking mechanism, means for supporting said mechanism on said coupler, said mechanism including a supporting member engaging with said means, and having a portion extending beyond said means for engaging said coupler to position said mechanism, and interconnected levers for operation of said lock, one of said levers being supported on said means and the other of said levers being supported on said supporting member.

7. A support for a coupler lock operating mechanism, comprising an elongated body portion having spaced arm portions at one end, spaced hook members on said arms, said arms being provided adjacent their ends with lugs forming bearing portions, and a pivot member adjacent the other end of said body portion.

8. A support for a coupler lock operating mechanism, comprising an elongated body portion having spaced arm portions at one end thereof, spaced hook members on said arms, said arms being provided adjacent their ends with lugs forming bearing portions, the other end of said body portion being formed with spaced flanges, and a pivot member between said flanges.

9. In coupler mechanism, the combination of a car coupler and lock therefor, supporting means, a supporting member engageable with said means, means for operating said lock, said means comprising a plurality of interconnected members including spaced levers operatively disposed in substantially parallel relation, one of said levers being supported by said supporting member, and the other of said levers being engageable with and supported by said supporting means.

10. In coupler mechanism, the combination of a car coupler and lock therefor, means for actuating said lock, said means including interconnected spaced levers, means for supporting said levers, said means including a pivot pin and a supporting member mounted on said coupler, said member having a pivot pin, a lever being supported on each of said pins, and means associated with said pivot pins for interlockingly engaging said levers, said levers having a hook portion engageable with said pins and being normally disposed between said pins and means whereby said levers may be connected to and disconnected from said pins only by a movement of rotation relative thereto.

11. In coupler mechanism, the combination of a car coupler and lock therefor, an uncoupling mechanism removably connected to said coupler, said mechanism comprising a supporting member having an intermediate portion supported by said coupler and an end portion engageable with and fixed in operative relation to said coupler by the overbalanced weight of the other end of said member extending beyond said intermediate portion, said mechanism further including means for operating said lock.

12. In coupler mechanism, the combination of a car coupler and lock therefor, an uncoupling mechanism removably connected to said coupler, said mechanism comprising a supporting member having an intermediate portion supported by said coupler and an end portion engageable with and fixed in operative relation to said coupler by the overbalanced weight of the other end of said member extending beyond said intermediate portion, said mechanism including interconnected levers for operation of said lock.

13. In coupler mechanism, the combination of a car coupler and lock therefor, supporting means on said coupler, a supporting member having means intermediate the ends thereof pivotally engaging said supporting means, said supporting member having an end portion engaging with said coupler when supported by said supporting means to position the same and to hold said member against pivotal movement about said supporting means in one direction, and means supported by said member for transmitting operative movements to said lock.

14. In coupler mechanism, the combination of a car coupler and lock therefor, supporting means on said coupler, a supporting member provided with a hook portion intermediate the ends thereof pivotally engaging said supporting means, said supporting member having an end portion engaging with said coupler when supported by said supporting means to position the same and to hold said member against pivotal movement about said supporting means in one direction, and means supported by said member for transmitting operative movements to said lock.

15. In coupler mechanism, the combination of a car coupler and lock therefor, supporting means on said coupler, a supporting member provided with a hook portion intermediate the ends thereof pivotally engaging said supporting means, said supporting member having an end portion engaging with said coupler when supported by said supporting means to position the same and to hold said member against pivotal movement about said supporting means in one direction, means for normally preventing disconnection between said hook portion and supporting means, and means supported by said member for transmitting operative movements to said lock.

EDMUND P. KINNE.